US007761415B2

(12) United States Patent
Kalia et al.

(10) Patent No.: US 7,761,415 B2
(45) Date of Patent: Jul. 20, 2010

(54) METHOD, SYSTEM AND COMPUTER PROGRAM PRODUCT FOR MAINTAINING SYNCHRONIZATION OF FILES

(75) Inventors: Suman K. Kalia, Maple (CA); Kevin Quan, Toronto (CA); Grant D. Taylor, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 11/843,726

(22) Filed: Aug. 23, 2007

(65) Prior Publication Data

US 2009/0055441 A1    Feb. 26, 2009

(51) Int. Cl.
*G06F 7/00* (2006.01)
*G06F 17/00* (2006.01)

(52) U.S. Cl. .................................................. 707/610
(58) Field of Classification Search .................. 707/610
See application file for complete search history.

(56) References Cited

U.S. PATENT DOCUMENTS 7,386,575 B2 * 6/2008 Bashant et al. .............. 707/201
2008/0154981 A1 * 6/2008 Bezukov ..................... 707/203
2008/0208806 A1 * 8/2008 Dalfo et al. ..................... 707/3

* cited by examiner

*Primary Examiner*—John R. Cottingham
*Assistant Examiner*—Susan F Rayyan
(74) *Attorney, Agent, or Firm*—Cantor Colburn LLP; Libby Toub

(57) ABSTRACT

A method for synchronizing data files, the method comprising: within a messaging utility, associating a Web Service Definition Language (WSDL) definition with a data file, the association made by a passive reference between the WSDL definition to the data file; creating a reference table identifying WSDL files and referenced data files; determining if the WSDL file has changed, if the WSDL file has changed then: determining if a reference to a data file exists in the changed WSDL file; adding an entry in the reference table associating the WSDL file and the data file; launching a component of a builder application to build the data file; and determining if any additional references to data files exist in the changed WSDL file; determining if the data file has changed, if the data file has changed then: determining if the changed data file is referenced by a WSDL file by examining the reference table; if the changed data file exists in the reference table, then launching a component of the builder application to build the WSDL file referencing the changed data file.

4 Claims, 2 Drawing Sheets

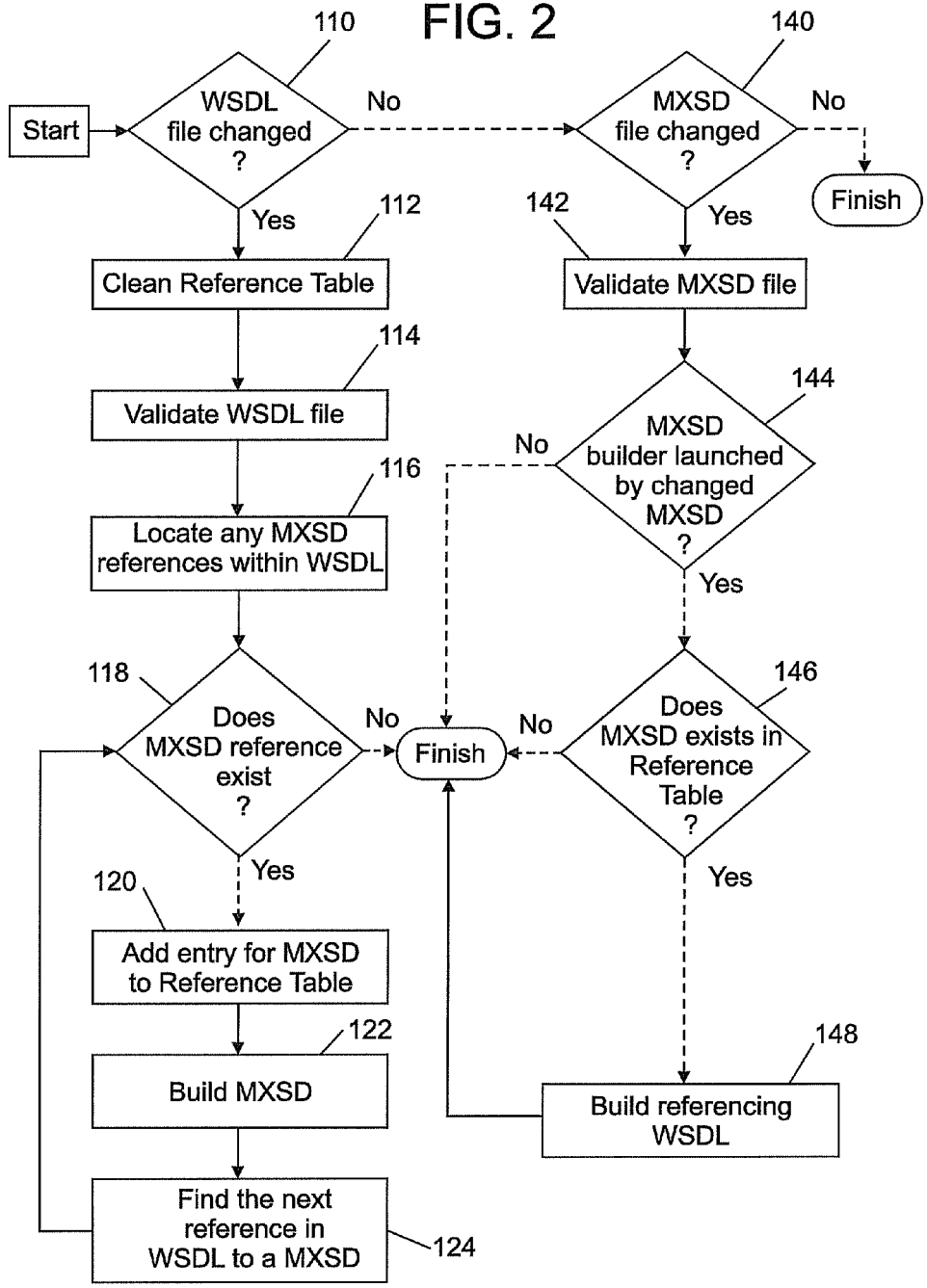

METHOD, SYSTEM AND COMPUTER PROGRAM PRODUCT FOR MAINTAINING SYNCHRONIZATION OF FILES

BACKGROUND OF THE INVENTION

1. Field of the Invention

This invention relates to maintaining synchronization of data files, and particularly to maintaining synchronization of XML schema definitions (XSD) files referenced by Web Service Definition Language (WSDL) files.

2. Description of Background

A messaging utility, such as Message Broker Toolkit (MBT), is a development environment utilizing Web Service Definition Language (WSDL) files, which are supplied by end users, to define specific attributes of a message set. A message set is a fundamental organizational and functional component of MBT.

A WSDL definition supplied by the user is incorporated into a message set when an end user performs an import operation using MBT. This import operation transforms certain components of the WSDL definition into a format that facilitates the use of the WSDL within MBT.

A WSDL definition defines data structures using XML. These data structures may be defined as XML Schema Definitions (XSD), which can either be placed directly within the WSDL definition or imported from an external file (i.e., a separate XSD definition). One of the transformations performed by the MBT import operation is to transform these XSD files, regardless of their format within the WSDL definition, into message definitions (MXSD). These message definitions are then stored external to the WSDL definition; that is, the WSDL definition either has an XSD import (if the namespace between the message definition and the WSDL definition is different) or an XSD include (if the namespaces are the same) that references the created MXSD. This reference is passive and defined by specifying the physical file path from the WSDL definition to the MXSD (thus the MXSD has no knowledge of which WSDL definitions reference it). As the reference is passive, there is no mechanism that ensures that the reference is valid.

In order for the WSDL definition to be complete and usable within MBT, the MXSD files referenced by the WSDL definition must exist. However, as the message definitions are resources within MBT analogous to files, they can be renamed, moved or deleted. When the user performs one of those actions on a MXSD file, it is probable that the reference to that MXSD file within a WSDL definition will no longer be valid. Similarly, the MXSD file can be edited by the user into an invalid state. The effect of these actions is that the WSDL definition will be in an erroneous state and cannot be utilized by MBT. However, the end user will not be automatically made aware of this effect because the reference is passive.

This is a significant problem because if the WSDL definitions imported by the user are made invalid through a seemingly innocuous and unrelated change, when the user attempts to use the WSDL definition, they will experience unexpected and erroneous behavior. This has several repercussions. The user may lose confidence in themselves and challenge their assumptions and knowledge of the MBT. The user may lose confidence in the stability, functionality and behavior of MBT. The user will need to spend time to determine the root cause of the erroneous behavior and resolve it. This problem exhibits a direct cost on the end user, and a future cost on the makers of the product and the user.

SUMMARY OF THE INVENTION

The shortcomings of the prior art are overcome and additional advantages are provided through the provision of a method for synchronizing data files, the method comprising: within a messaging utility, associating a Web Service Definition Language (WSDL) definition with a data file, the association made by a passive reference between the WSDL definition to the data file; creating a reference table identifying WSDL files and referenced data files; determining if the WSDL file has changed, if the WSDL file has changed then: determining if a reference to a data file exists in the changed WSDL file; adding an entry in the reference table associating the WSDL file and the data file; launching a component of a builder application to build the data file; and determining if any additional references to data files exist in the changed WSDL file; determining if the data file has changed, if the data file has changed then: determining if the changed data file is referenced by a WSDL file by examining the reference table; if the changed data file exists in the reference table, then launching a component of the builder application to build the WSDL file referencing the changed data file.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which provides enhanced usability of messaging utilities by preserving synchronization between WSDL definitions and MXSD files so that the messaging utility functions properly.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 illustrates one example of a process for implementing a method for maintaining synchronization of files.

Figure 1:
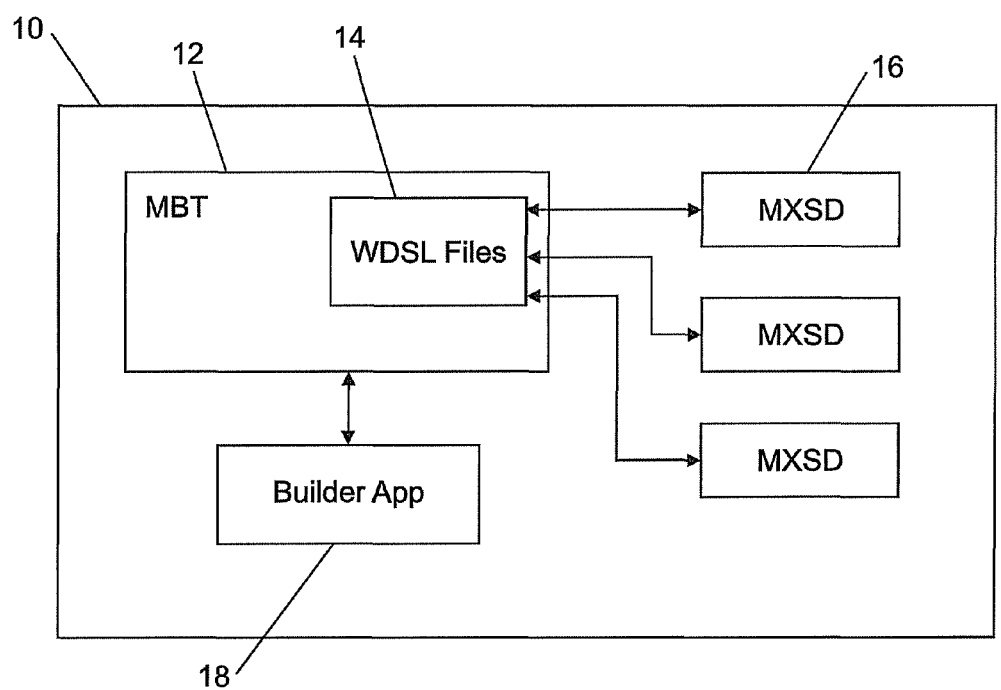
FIG. 1 illustrates one example of a system for implementing a method for maintaining synchronization of files.

The detailed description explains the preferred embodiments of the invention, together with advantages and features, by way of example with reference to the drawings.

DETAILED DESCRIPTION OF THE INVENTION

Turning now to the drawings in greater detail, it will be seen that in FIG. 1 there is an exemplary system for implementing a method for maintaining synchronization of files. System 10 is implemented on a computing device such as a general-purpose personal computer, server, personal digital assistant or other processor-based device. System 10 operates in response to a computer program stored on a computer-readable medium accessible by the system 10. A messaging utility 12 may be implemented using a Message Builder Toolkit (MBT) application. The messaging utility 12 uses WSDL files 14 to define attributes of a message set. The WSDL files 14 use message definitions stored in separate files 16, which may be Message XML Schema Definitions (MXSD). As noted above, the reference between the WSDL files 14 and the MXSD files 16 is passive, and thus modification of the file 16 can cause errors in the messaging application.

Embodiments of the invention include a builder application 18 that interfaces with the messaging application 12. The builder application 18 may be implemented using a variety of development platforms, such as Eclipse. The builder application 18 can maintain the reference between the WSDL files 14 and the data files 16 by building files when an action occurs with respect to one of the data files 16 and/or the WSDL files 14. The builder application 18 includes components for building files of arbitrary types, including WSDL and MXSD files. The builder application 18 monitors WSDL files 14 and data files 16 and builds the appropriate type of file if a file is changed in one of the following manners: a file is created, a file is renamed, a file is deleted, a file is moved or file content is changed.

In embodiments of the invention, the builder application 18 creates and maintains a reference table to track data files 16 used by the WSDL files 14. A custom data structure, referred to as a reference table, is utilized to link dependent, passive resources. When a WSDL file 14 or MXSD file 16 is changed, the builder application 18 component defined for the particular type of file will be called and will utilize the reference table to ensure that the passive references between the WSDL files 14 and the MXSD files 16 are synchronized and valid. If any MXSD files referenced by the WSDL files are invalid, an error will be raised.

When a WSDL file 14 is changed in one of the manners above, the builder application 18 will call a builder component defined for WSDL files, implemented by MBT 12. This WSDL builder component will examine the WSDL definition and determine if there exist any passive references to MXSD files 16. If one or more references exist, each reference will be written in to a custom data structure referred to as the reference table. A second action performed by the WSDL builder will be to validate the WSDL file. This includes ensuring that MXSD files 16 referenced by the WSDL definition 14 exist and are themselves valid. If any MXSD files 16 referenced by the WSDL 14 are invalid, an error will be raised. Duplicate entries in the reference table are prevented by cleaning the reference table of all entries that include the WSDL definition at the beginning of the WSDL build process.

When a MXSD file 16 is changed in one of the manners described, the builder application will call a builder component defined for MXSD files 16, implemented by MBT 12. After the MXSD resource has been built, the last action of the MXSD builder will be to examine the reference table to determine if there are any WSDL definitions that reference the MXSD resource being built. This action will only be performed if the MXSD builder was initiated due to an individual MXSD file being changed. If one or more WSDL definitions reference this MXSD file, then the WSDL builder will be called for each WSDL definition in turn.

A flow chart of the method that maintains synchronization of passive resources is shown in FIG. 2. Population of the reference table is performed when the resources (i.e., WSDL and MXSD files) are first imported. The import operation causes the files to be created thus initiating the builder application system to build the WSDL file(s) and populating the reference table.

If a WSDL file 14 or a MXSD file 16 is changed, the process is initiated at step 110 where it is determined if a WSDL file 14 has changed. If so, flow proceeds to step 112 where the reference table is cleaned and the existing WSDL files are validated at step 114. At 116, the WSDL file 14 is searched for the existence of any MXSD references and at step 118 it is determined if a MXSD reference exists. If not, the process ends. If so, flow proceeds to step 120 where the reference to the MXSD file is entered in the reference table. At step 122, the MXSD file is built by MXSD builder component of the builder application 18. Step 124 finds the next reference in the WSDL file to a MXSD file and continues looping until all MXSD references have been processed.

The process also checks for changes in MXSD files at step 140. If a change is detected, flow proceeds to step 142 where the MXSD file is validated. At step 144 it is determined if the MXSD builder component of the builder application 18 was launched by a changed MXSD file. If not, the process ends. If so, it is then determined at step 146 whether the MXSD file exists in the reference table. If not, the process ends as no WSDL file refers to the changed MXSD file. If so, flow proceeds to step 148 where the builder application builds the WSDL file referring to the MXSD file to accommodate the change in the MXSD file.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for synchronizing data files, the method comprising:
    within a messaging utility, associating a Web Service Definition Language (WSDL) definition with a Message XML Schema Definition (MXSD) data file, the association made by a passive reference between the WSDL definition to the data file, the MXSD file defining a message data structure for the WSDL file;
    creating a reference table identifying WSDL files and referenced MXSD data files;

determining if the WSDL file has changed, if the WSDL file has changed then:
　　cleaning the reference table of any entries having the WSDL definition prior to building the MXSD data file;
　　determining if a reference to a MXSD data file exists in the changed WSDL file;
　　adding an entry in the reference table associating the WSDL file and the MXSD data file;
　　launching a component of a builder application to build the MXSD data file; and
　　determining if any additional references to MXSD data files exist in the changed WSDL file;
determining if the MXSD data file has changed, if the MXSD data file has changed then:
　　determining if the changed MXSD data file is referenced by a WSDL file by examining the reference table;
　　if the changed MXSD data file exists in the reference table, then launching a component of the builder application to build the WSDL file referencing the changed MXSD data file.

2. The method of claim 1 wherein:
if the WSDL file has changed then validating the WSDL file exists and is valid.

3. The method of claim 1 wherein:
determining if the WSDL file has changed includes determining if the WSDL file has been created, renamed, deleted, moved or had content changed.

4. The method of claim 1 wherein:
determining if the MXSD data file has changed includes determining if the MXSD data file has been created, renamed, deleted, moved or had content changed.

* * * * *